United States Patent
Hanis et al.

(10) Patent No.: US 10,042,915 B2
(45) Date of Patent: Aug. 7, 2018

(54) SEMANTIC MAPPING OF TOPIC MAP META-MODELS IDENTIFYING ASSETS AND EVENTS TO INCLUDE DIRECTIONALITY

(71) Applicant: INTERNATIONAL BUSINESS MACHINES CORPORATION, Armonk, NY (US)

(72) Inventors: Thomas T. Hanis, Raleigh, NC (US); Eoin Lane, Littleton, MA (US); Ke Zhang, Beijing (CN); Zhuo Z. Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 14/867,156

(22) Filed: Sep. 28, 2015

(65) Prior Publication Data

US 2017/0091304 A1 Mar. 30, 2017

(51) Int. Cl.
*G06F 17/30* (2006.01)

(52) U.S. Cl.
CPC .. *G06F 17/30598* (2013.01); *G06F 17/30321* (2013.01); *G06F 17/30528* (2013.01); *G06F 17/30604* (2013.01)

(58) Field of Classification Search
None
See application file for complete search history.

(56) References Cited

U.S. PATENT DOCUMENTS

| 6,351,715 B1 | 2/2002 | Ykema |
| 7,467,145 B1 | 12/2008 | Castellanos et al. |
| 7,664,712 B1 | 2/2010 | Duvall et al. |

(Continued)

FOREIGN PATENT DOCUMENTS

| WO | 0042529 A1 | 7/2000 |
| WO | 2011065969 A2 | 6/2011 |

(Continued)

OTHER PUBLICATIONS

U.S. Appl. No. 14/081,241:Non-Final Rejection dated Sep. 20, 2016.

(Continued)

*Primary Examiner* — Debbie Le
(74) *Attorney, Agent, or Firm* — Brown & Michaels, PC; Anthony England

(57) ABSTRACT

Method, computer program product and computer system for assigning a direction of impact to an association between assets based on an impact of an event mapped to at least one of the assets. To assign a direction of impact, a first topic map meta-model is created that identifies assets and events in a topic map based index with instance ontology based on a topic map meta model that identifies assets and a topic map meta-model that identifies events. An identification is assigned in the first topic map meta-model to at least one association between at least one asset of the topic map meta-model that identifies assets and at least one event of the topic map meta-model that identifies events and a second topic map meta-model being created that identifies at least one association and instance ontology with direction of impact assigned to the at least one association in various scopes.

15 Claims, 12 Drawing Sheets

(56) References Cited

U.S. PATENT DOCUMENTS

| | | | |
|---|---|---|---|
| 7,962,589 | B1 | 6/2011 | Parello et al. |
| 8,051,164 | B2 | 11/2011 | De Peuter et al. |
| 8,301,755 | B2 | 10/2012 | De Peuter et al. |
| 8,645,904 | B2 | 2/2014 | Coldicott et al. |
| 9,123,004 | B2* | 9/2015 | Coldicott .............. G06Q 10/06 |
| 9,535,978 | B2* | 1/2017 | Coldicott .......... G06F 17/30616 |
| 2004/0034652 | A1 | 2/2004 | Hofmann et al. |
| 2004/0093344 | A1* | 5/2004 | Berger .............. G06F 17/30557 |
| 2005/0289166 | A1 | 12/2005 | Stanley et al. |
| 2006/0190368 | A1* | 8/2006 | Kesterman ............ G06Q 40/00 |
| | | | 705/35 |
| 2007/0027666 | A1 | 2/2007 | Frankel |
| 2007/0074076 | A1 | 3/2007 | Imai et al. |
| 2007/0130231 | A1 | 6/2007 | Brown et al. |
| 2007/0288219 | A1 | 12/2007 | Zafar et al. |
| 2008/0033993 | A1 | 2/2008 | Uceda-Sosa |
| 2008/0125942 | A1 | 5/2008 | Tucker et al. |
| 2008/0307523 | A1 | 12/2008 | Subramanyam et al. |
| 2009/0044129 | A1 | 2/2009 | Ebrom et al. |
| 2009/0157419 | A1 | 6/2009 | Bursey |
| 2009/0248488 | A1 | 10/2009 | Shah et al. |
| 2009/0287674 | A1 | 11/2009 | Bouillet et al. |
| 2009/0299696 | A1 | 12/2009 | Shiihara et al. |
| 2009/0327242 | A1 | 12/2009 | Brown et al. |
| 2010/0049564 | A1 | 2/2010 | Lewis et al. |
| 2010/0100546 | A1 | 4/2010 | Kohler |
| 2010/0162401 | A1 | 6/2010 | Sakaki et al. |
| 2010/0228693 | A1 | 9/2010 | Dawson et al. |
| 2011/0099050 | A1 | 4/2011 | Coldicott et al. |
| 2011/0099139 | A1 | 4/2011 | Coldicott et al. |
| 2011/0099536 | A1 | 4/2011 | Coldicott et al. |
| 2011/0153636 | A1 | 6/2011 | Coldicott et al. |
| 2011/0169835 | A1 | 7/2011 | Cardno et al. |
| 2012/0016858 | A1 | 1/2012 | Rathod |
| 2012/0102050 | A1 | 4/2012 | Button et al. |
| 2012/0102371 | A1 | 4/2012 | Tonouchi |
| 2012/0155715 | A1 | 6/2012 | Buscema |
| 2012/0278353 | A1 | 11/2012 | Carrato et al. |
| 2013/0173523 | A1 | 7/2013 | Sanchez et al. |
| 2013/0262367 | A1* | 10/2013 | Coldicott .............. G06Q 10/06 |
| | | | 706/52 |
| 2013/0332240 | A1* | 12/2013 | Patri ...................... G06Q 10/06 |
| | | | 705/7.36 |
| 2014/0280228 | A1* | 9/2014 | Coldicott .......... G06F 17/30616 |
| | | | 707/748 |
| 2014/0282404 | A1 | 9/2014 | Gonsalves |
| 2015/0066827 | A1 | 3/2015 | Brereton et al. |
| 2015/0081689 | A1 | 3/2015 | Marshall |
| 2015/0178300 | A1 | 6/2015 | Roy et al. |
| 2016/0247246 | A1* | 8/2016 | Bluestone ........... G06F 11/1458 |

FOREIGN PATENT DOCUMENTS

| | | |
|---|---|---|
| WO | 2011065969 A3 | 6/2011 |
| WO | 2012106922 A1 | 8/2012 |
| WO | 2013138969 A1 | 9/2013 |
| WO | 2013159639 A1 | 10/2013 |

OTHER PUBLICATIONS

U.S. Appl. No. 14/018,872; Non-Final Rejection dated Sep. 20, 2016.
U.S. Appl. No. 14/949,981; Final Rejection dated Oct. 20, 2016.
Fakcharoenphol et al. "Planar graphs, negative weight edges, shortest paths, and near linear time." Foundations of Computer Science, 2001. Proceedings. 42nd IEEE Symposium on. IEEE, 2001.
Becker, T., et al. "Semantic 30 modeling of multi-utility networks in cities for analysis and 30 visualization". (2012). [retrieved from <http://www.mediatum.ub.tm.de>].
Corbo, J., et al. "An economically-principled generative model of AS graph connectivity." Infocom 2009, IEEE. IEEE, 2009.
Zhang et al. "Cloud computing: state-of-the-art and research challenges." Journal of internet services and applications 1.1 (2010): 7-18.
U.S. Appl. No. 14/081,241; Final Rejection dated Feb. 22, 2017.
U.S. Appl. No. 14/018,872; Final Rejection dated Feb. 22, 2017.
Schaefer et al., Smarter City Series: Understanding the IBM approach to Traffic Management, 2011, http://ip.com/pdf/redbook/REDP473700.pdf.
Le Grand et al., Topic Maps, RDF Graphs and Ontologies Visualization, Jan. 1, 1999, http://www-rp.lip6.fr/~blegrand/Publis/VSW_book.pdf.
Heidinger et al. "Towards Collaborative Web-Based Impact Assessment", Proceedings of the 10th Annual International Conference on Digital Government Research: Social Networks: Making Connections between Citizens, Data and Government pp. 190-198; 2009.
Bailey et al. "Flavours of XChange, a Rule-Based Reactive Language for the (Semantic) Web", Rules and Rule Markup Languages for the Semantic Web; vol. 3791 of the series Lecture Notes in Computer Science pp. 187-192; Nov. 2005.
U.S. Appl. No. 13/433,384; Non-Final Rejection dated May 1, 2014.
U.S. Appl. No. 13/433,384; Final Rejection dated Sep. 10, 2014.
U.S. Appl. No. 13/433,384; Non-Final Rejection dated Dec. 24, 2014.
U.S. Appl. No. 14/293,292; Non-Final Rejection dated Feb. 25, 2016.
U.S. Appl. No. 14/018,872; Non-Final Rejection dated Jul. 22, 2015.
U.S. Appl. No. 14/081,241; Non-Final Rejection dated Sep. 3, 2015.
U.S. Appl. No. 14/081,241; Final Rejection dated Mar. 11, 2016.
U.S. Appl. No. 14/018,872; Final Rejection dated Apr. 8, 2015.
U.S. Appl. No. 14/949,981; Non-Final Rejection dated May 20, 2016.
Hunter, J. "MetaNet A Metadata Term Thesaurus to Enable Semantic Interoperability Between Metadata Domains", Journal of Digital Information, vol. 1, No. 8, 2001.
Lacher, M. S. "On the Integration of Topic Maps and RDF Data", Extreme Markup Languages 2001; Montréal, Québec; Aug. 2001.
Kim et al, "Cause-and-Effect Function Analysis", Proceedings of the 2010 IEEE ICMIT.
Potgieter et al, "Adaptive Bayesian agents: Enabling distributed social networks", S.Afr.J.Bus.Manage.2006, 37(1).
Reusch et al, "Integrated Tool Sets for Business Games and Simulation", Computing, 2008, vol. 7, Issue 2, 59-65.
Rouse, "Topic Map Query language (TMQl)", Sep. 2005.
Ruther, M. "Sharing Environmental Vocabulary", EnviroInfo 2004 (Geneva), p. 293-295, 18th International Conference "Informatics for Environmental Protection", Geneva, 2004.
Ruther et al. "SNS Environmental Vocabulary—from Terms to Ontology", Semantics 2006 Vienna, Nov. 28-30, 2006.
"Weighted edges in topic maps", Google Forum Groups; retrieved from https://groups.google.com/forum/?fromgroups#!topic/ontopia/cBZqr73vOal; Oct. 2010.
Kehoe et al. "Smarter cities series: a foundation for understanding IBM smarter cities", Redguides for Business Leaders, IBM; 2011.
U.S. Appl. No. 14/081,241; Non-Final Rejection dated Aug. 16, 2017.
U.S. Appl. No. 14/018,872; Non-Final Rejection dated Aug. 16, 2017.
U.S. Appl. No. 14/949,981; Non-Final Rejection dated Nov. 20, 2017.
U.S. Appl. No. 14/081,241; Final Rejection dated Mar. 7, 2018.
U.S. Appl. No. 14/018,872; Final Rejection dated Mar. 7, 2018.
U.S. Appl. No. 14/949,981; Final Rejection dated Apr. 6, 2018.

* cited by examiner

307

SEMANTIC MAPPING OF TOPIC MAP META-MODELS IDENTIFYING ASSETS AND EVENTS TO INCLUDE DIRECTIONALITY

BACKGROUND

The present invention relates to semantic mapping, and more specifically to semantic mapping of a first topic map meta-model identifying assets to a second topic map meta-model identifying events to form a third topic map meta-model that represents a semantic mapping of assets to events and assigning directionality to the associations between the assets and events in the third topic map meta-model in various scopes identified within another topic map meta-model and storing the directionality in a data structure, the directionality being indicative of a direction of possible impact of an event on one or more assets.

Manufacturing and production based companies have enormous investments in assets and physical infrastructure that are part of the operational processes that drive their business. Optimizing the use of those assets is critical to a company's operational effectiveness and therefore its profitability.

Often times, companies will leverage asset optimization solutions to monitor key performance indicators, leverage analytics to anticipate warning or failure conditions, to schedule maintenance, and optimize resource scheduling against anticipated workload.

One aspect of optimization solutions is the understanding of the relationships between assets and events that could affect them directly or indirectly.

The equipment or assets that run the manufacturing or production processes are generally connected to servers or controllers to generate operational data that can be used to monitor the manufacturing or production process. Typically, companies will collect the operational data and perform operational analysis to provide immediate performance characteristics that can often be represented in dashboards, score sheets, or reports. Information models can be used to represent how assets are deployed and the relationships between assets such as connections, associations or containment. Armed with both the model information and the "real time" operational data, organizations can perform current or future condition analyses on assets and asset groups.

Similarly, organizations may use event models to understand relationships between events within their physical infrastructure. These event models may be explicitly defined, or they could be implicit in the deployment of business operational processes. These processes could be programmatic, rule based, or supplied by a knowledge expert. But independent of how they are manifested, they represent relationships between events that occur within the operational process. For example, the event model would be able to tell a customer what response needs to occur if a critical piece of equipment is operating over a specific threshold, for example running too hot or consuming too much power.

SUMMARY

According to one embodiment of the present invention a method of assigning a direction of impact to an association between assets based on an impact of an event mapped to at least one of the assets is disclosed. The method comprising the steps of: the computer creating a first topic map meta-model that identifies assets and events in a topic map based index with instance ontology based on a topic map meta model that identifies assets and a topic map meta-model that identifies events; the computer assigning an identification in the first topic map meta-model to at least one association between at least one asset of the topic map meta-model that identifies assets and at least one event of the topic map meta-model that identifies events; and the computer creating a second topic map meta-model that identifies at least one association between at least one asset and at least one event in a topic map based index and instance ontology with the direction of impact of the event on an association in various scopes between assets based on an impact of the event on at least one of the assets of the association.

According to another embodiment of the present invention, a computer program product for assigning a direction of impact to an association between assets based on an impact of an event mapped to at least one of the assets is disclosed. The computer program product comprising a computer comprising at least one processor, one or more memories, one or more computer readable storage media, the computer program product comprising a computer readable storage medium having program instructions embodied therewith, the program instructions executable by the computer to perform a method. The method comprising: creating, by the computer, a first topic map meta-model that identifies assets and events in a topic map based index with instance ontology based on a topic map meta model that identifies assets and a topic map meta-model that identifies events; assigning, by the computer, an identification in the first topic map meta-model to at least one association between at least one asset of the topic map meta-model that identifies assets and at least one event of the topic map meta-model that identifies events; and creating, by the computer, a second topic map meta-model that identifies at least one association between at least one asset and at least one event in a topic map based index and instance ontology with the direction of impact of the event on an association in various scopes between assets based on an impact of the event on at least one of the assets of the association.

According to another embodiment of the present invention, a computer system for assigning a direction of impact to an association between assets based on an impact of an event mapped to at least one of the assets is disclosed. The computer system comprising a computer comprising at least one processor, one or more memories, one or more computer readable storage media having program instructions executable by the computer to perform the program instructions. The program instructions comprising: creating, by the computer, a first topic map meta-model that identifies assets and events in a topic map based index with instance ontology based on a topic map meta model that identifies assets and a topic map meta-model that identifies events; assigning, by the computer, an identification in the first topic map meta-model to at least one association between at least one asset of the topic map meta-model that identifies assets and at least one event of the topic map meta-model that identifies events; and creating, by the computer, a second topic map meta-model that identifies at least one association between at least one asset and at least one event in a topic map based index and instance ontology with the direction of impact of the event on an association in various scopes between assets based on an impact of the event on at least one of the assets of the association.

DETAILED DESCRIPTION

Figure 1:
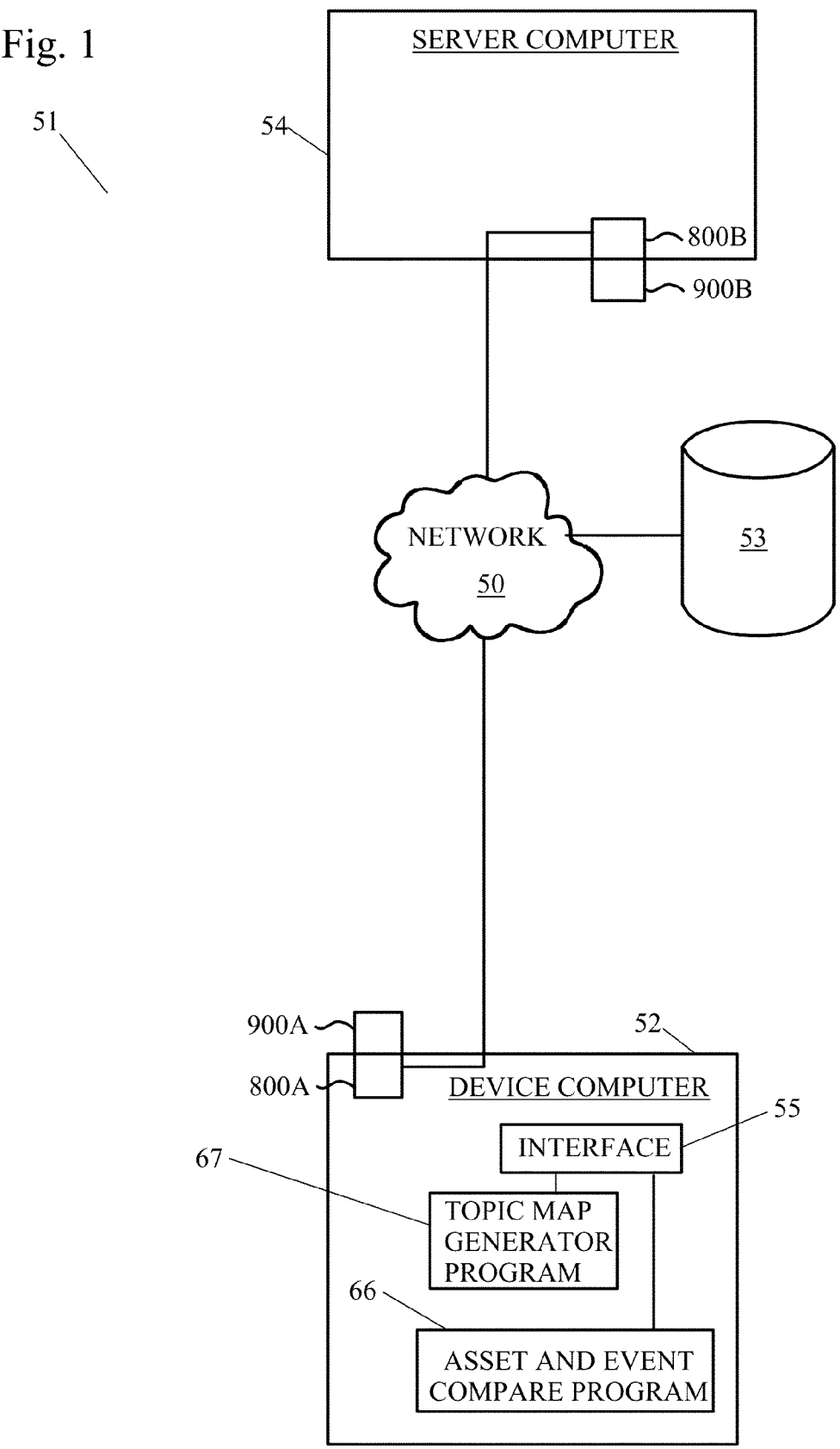
FIG. 1 depicts an exemplary diagram of a possible data processing environment in which illustrative embodiments may be implemented.

The illustrative embodiments recognize that, for effective operations, companies want to be able to answer more complicated questions about the operations of their equipment and/or assets and the result of various types of events. Examples are questions like: "What are the implications of this piece of equipment exceeding a threshold to other assets in my enterprise?" "Will there be upstream or downstream effects from exceeding the threshold on assets in my enterprise?" "What are upstream or downstream implications to assets that are related by proximity, direct or indirect physical connection based on configurations that exist now or that could change by operational cycles or time?" "What is command flow between assets when an event occurs?" "What are the dispersion patterns based on graph edge resistance (e.g. workload dispersal)?" "What is the SIM connectivity between devices?" The illustrative embodiments recognize that these questions are critical to a highly effective operational process and span the boundaries typically maintained by asset models and event models individually.

The illustrative embodiments recognize that models, such as asset models and event models, are deployed in relative isolation and do not provide a semantic understanding between the models. The illustrative embodiments also recognize that simply expanding the model definitions to attempt to include any relationship across the separate models, sacrifices the benefits associated with specifically focused models. Illustrative embodiments provide for interaction between individual models so that the collective values of the individual models can be fully leveraged to drive optimal business efficiencies. The collective values of the individual models and the interactions between the individual models may be stored in a separate meta-model with associated metadata which can be leveraged.

The terms "directionality," "impact direction" or "direction of impact" are defined as a direction of possible impact of an event on one or more assets. In one embodiment, the direction represents a flow of an impact of an event on one or more assets. In another embodiment, the direction represents a physical world infrastructure direction (e.g. water pipe flow). In another embodiment, the direction represents directionality through a connection. For example, the connection could be a pipe or power line and the flowing through the connection may be water or electricity. An event that acts on a system will have impact that is affected by the flow occurring through the connection.

The directionality, impact direction or direction of impact represents actual or predicted directional impact of an event on one or more assets or a flow through one or more assets, for example predicted or actual downstream or upstream effects on flow through assets or on assets by an event. An event may have an impact on one or more assets and the impacted assets can also impact other assets, which have dependencies upstream/downstream directionality on the assets in the same infrastructure or network.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, storage unit 53, and server computer 54 connect to network 50. In other exemplary embodiments, network data processing system 51 may include additional client computers, storage devices, server computers, and other devices not shown. Client computer 52 includes a set of internal components 800a and a set of external components 900a, further illustrated in FIG. 10. Client computer 52 may be, for example, a mobile device, a cell phone, a personal digital assistant, a netbook, a laptop computer, a tablet computer, a desktop computer, or any other type of computing device. Client computer 52 may contain an interface 55. Through interface 55, users may view different topic maps as well as a topic map meta-model which includes associations between assets and events. Additionally, through interface 55, any representation, for example graphs, of at least the directionality may be displayed on the topic map including associations between assets and events. Interface 55 may accept commands and data entry from a user, such as additional events, assets, or queries. Interface 55 can be, for example, a command line interface, a graphical user interface (GUI), or a web user interface (WUI) through which a user can access an asset-and-event compare program 66 and/or a topic map generator program 67 on client computer 52, as shown in FIG. 1, or alternatively on server computer 54. Server computer 54 includes a set of internal components 800b and a set of external components 900b illustrated in FIG. 10.

In the depicted example, server computer 54 provides information, such as boot files, operating system images, and applications to client computer 52. Server computer 54 can compute the information locally or extract the information from other computers on network 50.

Figure 10:
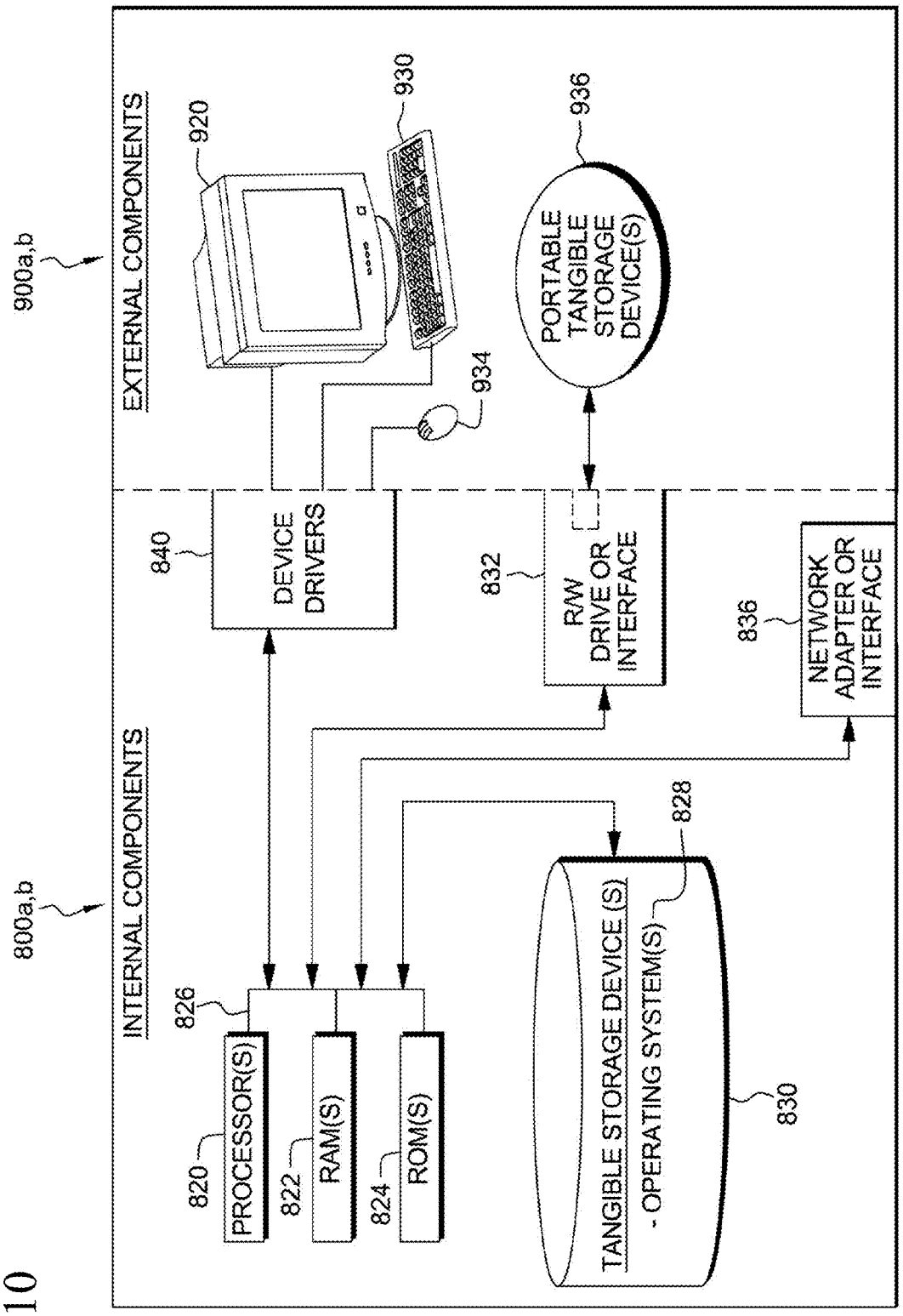
FIG. 10 illustrates internal and external components of a client computer and a server computer in which illustrative embodiments may be implemented.

Program code, meta-models, models identifying assets, models identifying events, models representing semantic mapping of assets to events, data structures identifying directionality, and programs such as topic map generator program 67 and asset-and-event compare program 66 may be stored on at least one of one or more computer-readable tangible storage devices 830 shown in FIG. 10, on at least one of one or more portable computer-readable tangible storage devices 936 as shown in FIG. 10, or on storage unit 53 connected to network 50, or may be downloaded to a computer, such as client computer 52 or server computer 54, for use. For example, program code, meta-models, models identifying assets, models identifying events, data structures identifying directionality and programs such as topic map generator program 67 and asset-and-event compare program 66 may be stored on at least one of one or more storage devices 830 on server computer 54 and downloaded to client computer 52 over network 50 for use on client computer 52. Alternatively, server computer 54 can be a web server, and the program code, meta-models, models identifying assets, models identifying events, data structures identifying directionality, and programs such as topic map generator program 67 and asset-and-event compare program 66 may be stored on at least one of the one or more storage devices 830 on server computer 54 and accessed on client computer 52. Topic map generator program 67 and asset-and-event compare program 66 can be accessed on client computer 52 through interface 55. In other exemplary embodiments, the program code, meta-models, models identifying assets, models identifying events, data structures identifying directionality, and programs such as topic map generator program 67 and asset-and-event compare program 66 may be stored on at least one of one or more computer-readable storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2A:
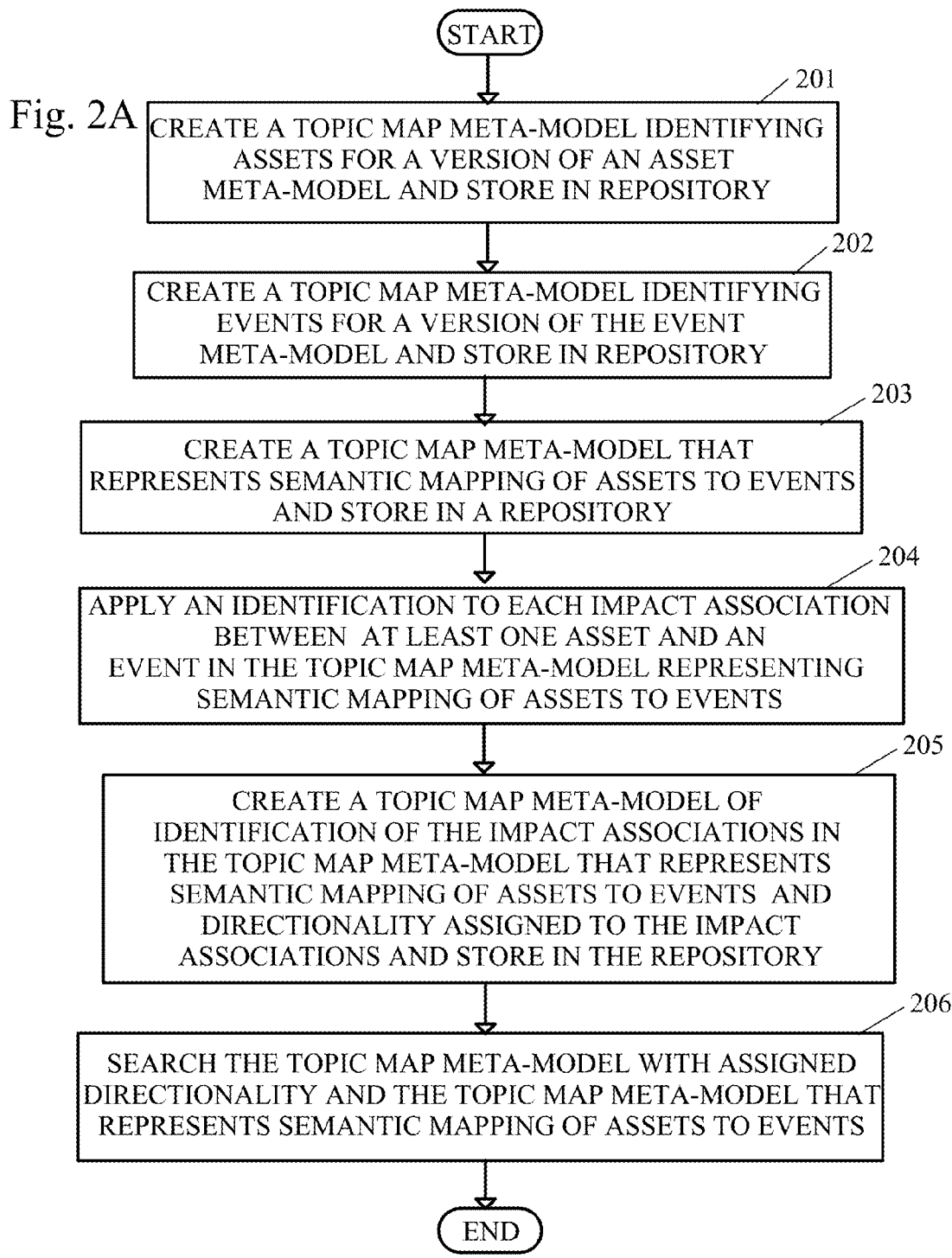
FIG. 2a shows a flowchart of a method of semantically mapping a first topic map meta-model identifying assets to a second topic map meta-model identifying events to form a third topic map meta model that represents semantic mapping of assets to events and assigning directionality to the associations between the assets and events in the third topic map meta-model in various scopes identified within a meta-model and storing the directionality in a data structure, the directionality being indicative of a direction of possible impact of an event on one or more assets of an illustrative embodiment.
Figure 2B:
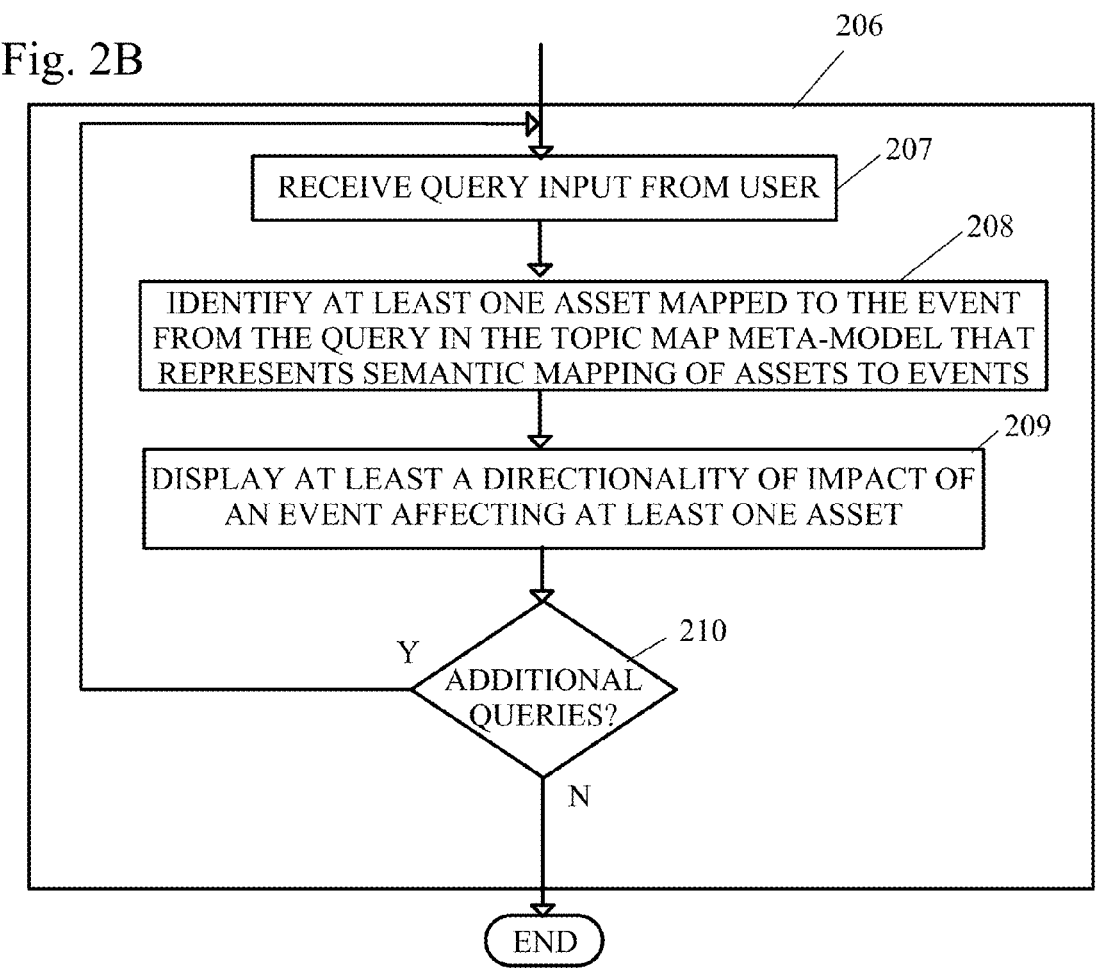
FIGS. 2b-2c show flowcharts of steps associated with searching topic map meta-models, according to illustrative embodiments.
Figure 2C:
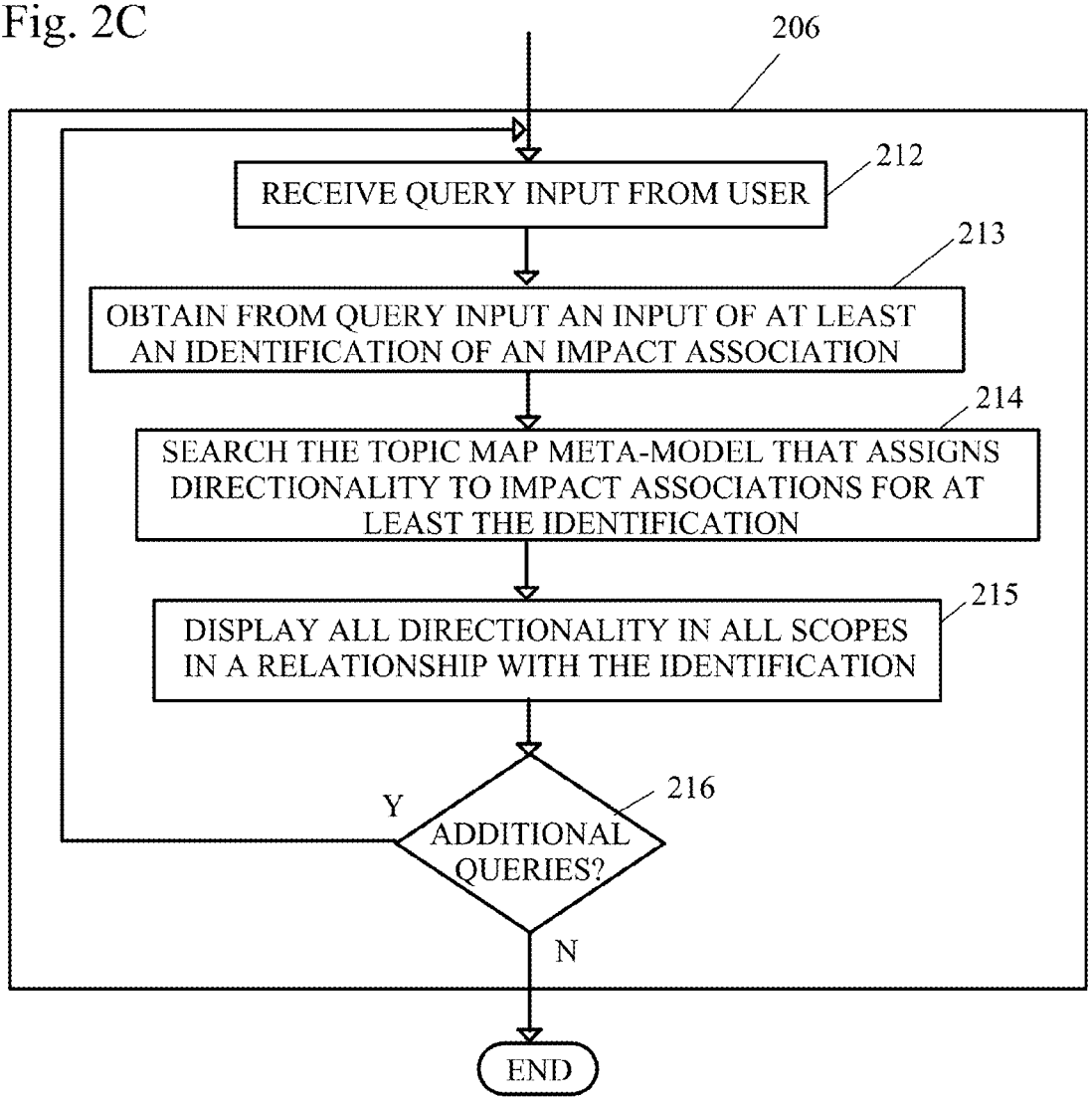

FIG. 2a shows a flowchart of a method of semantically mapping a first topic map meta-model identifying assets to a second topic map meta-model identifying events to form a third topic map meta model that represents semantic mapping of assets to events and assigning directionality to the associations between the assets and events in the third topic map meta-model in various scopes identified within a meta-model and storing the directionality in a data structure, the directionality being indicative of a possible impact of an event on one or more assets or flow through one or more assets, according to an illustrative embodiment. For simplicity, the directionality described in the flowcharts of FIGS. 2a-2c is represented as actual or predicted directional impact of an event on one or more assets, for example downstream or upstream effects that an event will have on a flow through at least one asset. In the third topic map meta-model, the directionality may be a two-tuples composed of a source role and a target role in association, for example, an association has two roles: role1 and role2. If the direction is from role1 to role2, the value of the directionally is (role1, role2), otherwise it is (role2, role1). It should be noted that directionality may be stored in the same topic map structure as a weight associated with the impact association, but in a different scope.

Figure 3:
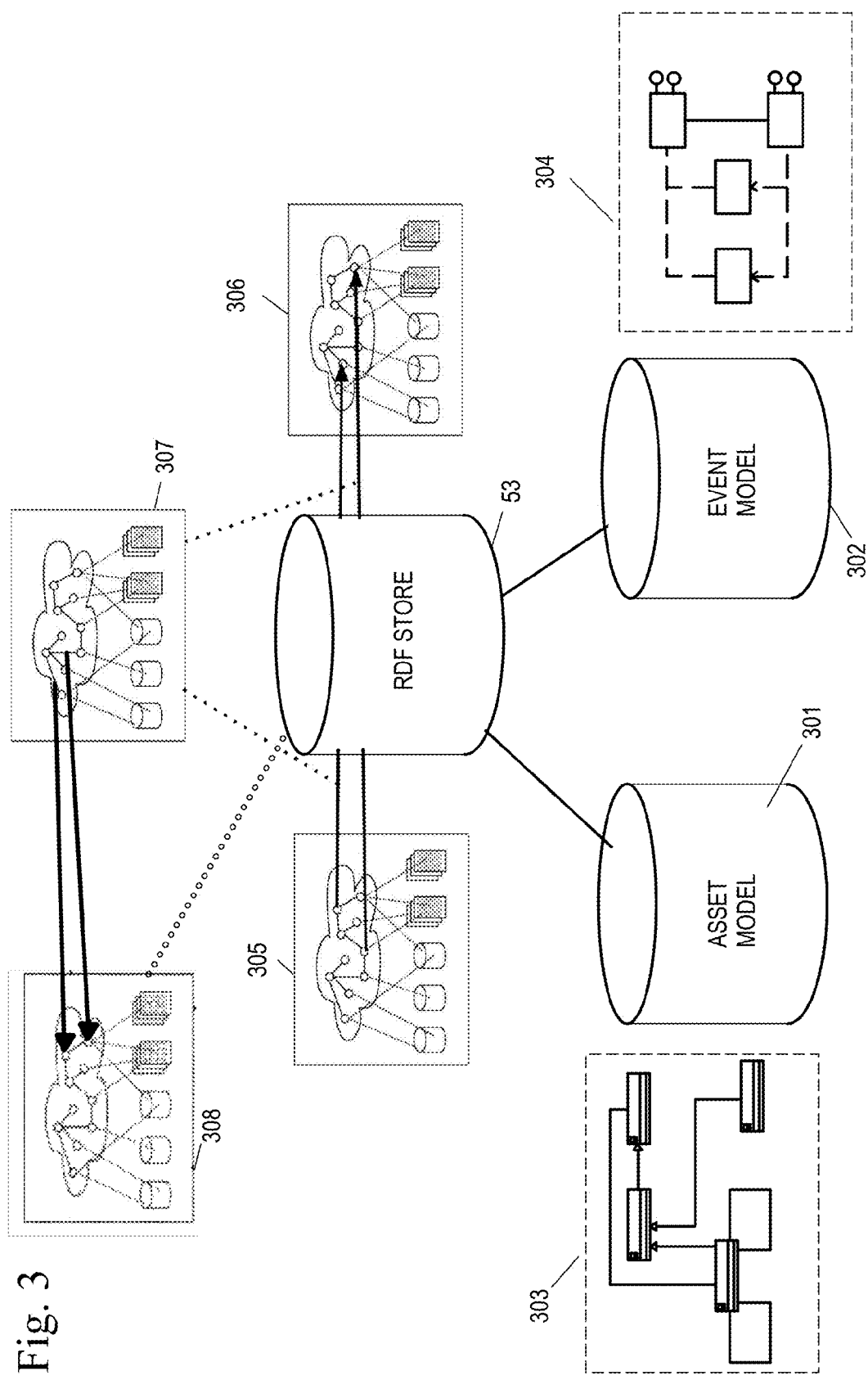
FIG. 3 shows an example of a possible relationship between a topic map meta-model that identifies assets, a topic map meta-model that identifies events, a topic meta-model that represents the semantic mapping of assets to events, and a topic map meta-model that identifies directionality in various scopes.

Topic map generator program 67 creates a topic map meta-model, including a topic map based index and instance ontology, of a meta-model identifying assets and stores the created topic map meta-model identifying assets in a repository (step 201). The repository may be repository 301 as shown in FIG. 3. It should be noted that while separate repositories 301, 302 for the different meta-models are shown in FIG. 3, one repository may be used.

Topic map generator program 67 creates a topic map meta-model, including a topic map based index and instance ontology, for a meta-model identifying events and stores the created topic map meta-model identifying events in a repository (step 202). The repository may be repository 302 as shown in FIG. 3.

Asset-and-event compare program 66 creates a topic map meta-model that maps assets in the topic map meta-model created at step 201 to events in the topic map meta-model created at step 202 and stores the topic map meta-model that represents the semantic mapping of assets to events in a repository (step 203). The topic map meta-model that represents the semantic mapping of assets to events may be created manually by a person with knowledge of how specific events affect assets or by the asset-and-event compare program 66. Asset-and-event compare program 66 can recursively recreate the topic map meta-model that represents the semantic mapping of assets to events as new events are generated or additional assets are added. An association between an event and at least one asset in the topic map meta-model that represents the semantic mapping of assets to events is herein referred as an "impact association", meaning that an occurrence of the event may have an impact on the at least one asset.

Asset-and-event compare program 66 applies an identification to each impact association between at least one asset and an event in the topic meta-model that represents the semantic mapping of assets to events (step 204). Each identification of an impact association is preferably unique among the impact associations and may distinguish between impact associations that may occur in different scopes through identifiers. In the topic meta-model that represents the semantic mapping of assets to events, more than one impact association can be present between assets and events. Each impact association is between an event and at least one asset semantically mapped to the event.

Asset-and-event compare program 66 creates a topic map meta-model of identifications of an impact association between at least one asset and an event in the topic map meta-model that represents semantic mapping of assets to events and directionality of the impact on the impact associations and stores the topic map meta-model in a repository (step 205). The directionality associated with the impact associations may be stored in a data structure. The data structure may be a meta-model which is part of the topic map meta-model of identifications of impact associations. This third topic map meta-model may include other information regarding the impact association besides directionality. The metadata within the third topic map meta-model may include other information in other scopes, for example versioning metadata, temporal metadata, and weights of impact metadata. By removing the metadata regarding the impact associations between an event and an asset from other topic map meta-models, and placing it in a third or other topic map meta-model, the metadata can be manipulated and queried.

The directionality is associated with or in a relationship with the identification applied to the association between at least one asset mapped to an event in the topic meta-model that represents the semantic mapping of assets to events. The directionality used with the topic map meta-model may be predefined within the meta-model, but is not necessary. Directionality as a factor in determining event effect may also be predefined, but the direction of the flow itself may vary. For example, if a gas is flowing under pressure, the pressure balance of the system may change, allowing the direction of flow of the gas to also change.

Each identification applied to an impact association preferably includes an identifier corresponding to the association, an identifier of the topics of the association, an identifier of the impact of one of the topics on another topic in the association or the roles the topics play in the association, for example impactee vs. impactor, an identifier of the scope, and an identifier of a direction of impact of an event on a corresponding asset of the association in the corresponding scope.

Asset-and-event compare program 66 can also search topic map meta-models (step 206).

FIG. 2b shows the steps associated with searching the topic map meta-models of a first embodiment with a query input specifying at least one asset and one event (step 207). The query may further include a scope.

The asset-and-event compare program 66 can receive the query input from a user through an interface, such as interface 55. Interface 55 may be a topic map interface, which may be a representational state transfer (REST) based interface, although other interfaces may be used. A REST interface is preferably used since REST is a standards-based Internet protocol and is self-documenting in terms of how to do the search, for example which domain to search, and which topic to search.

In one embodiment, the query input includes at least one domain. For example, the query input can have the following syntax:
 /search/<<domain>>/

The domain of the query input in this embodiment is the event applied to the overall system to be searched, for example the topic map meta-model that represents the semantic mapping of assets to events. An example of a query input received at step 207 to retrieve the direction impact that an event, in this case a cable alert (e.g. cable between a transformer and an end user's power meter), has on at least one asset in the overall system to be searched is as follows:
 /search/<<cable_alert>>/

It should be noted that the query input above may be artificially limited by and/or within the system being searched, for example within a specific city or region. Furthermore, the results of the query input may be further defined by the user.

Responsive to receiving this query input, asset-and-event compare program 66 can identify all power cables that have alerts within the system (e.g. city or region).

Alternatively, the query input may include at least one domain and at least one topic. For example, the query input can have the following syntax:
 /search/<<domain>>/<<topic>>/

The domain of the query input in this embodiment is the event to apply to the overall system to be searched. The topic of the query input is the asset(s) that the event may affect. An example of a query input received at step 207 to determine the direction of impact that the event (a cable alert, see topic map identifying events of FIG. 7) has on the asset(s) (WorkEquipment, see topic map identifying assets of FIG. 6) is as follows:
 /search/<<domain>>/cable_alert/<<topic>>/Asset_
  WorkEquipment/

Responsive to receiving this query input, asset-and-event compare program 66 may return results regarding the directionality of the impact the cable alert (which may indicate that the cable is broken or disconnected) will have on a specific asset, the Asset_WorkEquipment.

In another embodiment, the query input may include at least one domain, at least one topic, and at least one scope. For example, the query input can have the following syntax:
 /search/<<domain>>/<<topic>>/<<scope>>/

The domain of the query in this embodiment is the event to apply to the overall system to be searched, e.g. a cable alert. The topic of the query input is the asset(s) that the event may affect and the scope is a subset of the overall system. An example of a query input received at step 206 to return the direction of the impact of the event on the asset (a cable alert, see topic map identifying events of FIG. 7) on a specific asset (WorkEquipment, see topic map identifying assets of FIG. 6) in a determined scope (electric grid system) is as follows:

---

/search/<<domain>>/cable_alert/<<topic>>/Asset_WorkEquipment/<<scope>>/electric grid system/

---

The predefined directional impact of the impact association between the asset and the event, in this example WorkEquipment and cable alert, may vary depending on the scope as determined in the meta-model identifying predefined impact direction mapped to identification of the impact associations between at least one asset and an event in the topic map meta-model that represents semantic mapping of assets to events. For example, in a City Operation system, a cable alert can indicate which assets will be affected differently in terms of the electricity flowing downstream or upstream impact through the cable.

If the asset of WorkEquipment1 were a first power transformer providing power to multiple end users, the asset of WorkEquipment3 was another, second power transformer hundreds of miles away, connected to the asset of WorkEquipment4, a power plant, the direction of impact (flow of electricity) of an event (damage to the second power transformer—WorkEquipment3, due to a weather event), may result in different directionality in the scope of end users of the electrical grid system directly connected to the first power transformer, for example a reduced flow of electricity, than in the scope of the second transformer within the electric grid system. For example, the damage to the power transformer may affect an end user differently depending on where they are located, since transformers boost voltages of electricity, so it can travel long distances efficiently and reduce voltages as the electricity reaches the end user so it is suitable for consumption. In this example, the two different types of scope would be the first transformer within the electric grid system and the end user, each with its own topic map meta-model identifying assets.

In another embodiment, the scope may be time based or temporal. The scope may be set to be a specific time frame, for example ten years ago, to determine exactly what connections were present and how power was flowing in the electric grid system relative to the WorkEquipment1 at different times.

Additionally, the search query may include a radix, which is the number of degrees from the search topic to be returned. For example, a search result based on a query input that contained a radix of 1 would display results directly connected to the search topic. A search result based on a query input that contained a radix of 2 would display results of everything directly connected to the search topic and directly connected to the matters directly connected to the search topic. For example, the query input can have the following syntax:

/search/TopicMapService/<<domain>>/event-to-asset/<<topic>>/ID1/<<scope>>/direction/<<radix>>/1

The asset-and-event compare program 66 then identifies at least one asset mapped to the event from the query in the topic map meta-model that semantically maps assets to events created at step 203 (step 208).

Asset-and-event compare program 66 displays at least a direction of impact associated with an event on the at least one asset to be displayed to the user (step 209).

If there are additional queries (step 210), return to step 206 of searching the topic map meta-models. If there are no additional queries (step 210), the method ends.

In another alternative embodiment, the identification or identifier itself of the impact association between the assets and events of the topic map meta-model that represents semantic mapping of assets to events and associated with the impact direction in various scopes may be specifically queried.

FIG. 2c shows the steps associated with searching the topic map meta-models of a second embodiment with a query input specifying at least an identification (step 212).

The asset-and-event compare program 66 can receive the query input from a user through an interface, such as interface 55. Interface 55 may be a topic map interface, which may be a representational state transfer (REST) based interface, although other interfaces may be used. A REST interface is preferably used since REST is a standards-based Internet protocol and is self-documenting in terms of how to do the search.

For example, the query input can have the following syntax:
/search/TopicMapService/<<domain>>/direction_topic-map/<<topic>>/ID1/

In this embodiment, the domain specifies the topic map meta-model in which to search for the topic.

The asset-and-event compare program 66 obtains, from the query input, at least an identification of an impact association to search for and where to search, e.g. the topic map meta-model that includes as assignment of direction of impact to the impact associations (step 213). The asset-and-event compare program 66 then searches the topic map meta-model that assigns direction of impact to impact associations in a topic map meta-model created at step 205 for the assets and direction of impact associated with the identified impact association (step 214).

Asset-and-event compare program 66 displays all the directions of impact in all the scopes in a relationship with the identified impact association (step 215). It should be noted that in different scopes, a direction of impact of an event on at least one asset may be different.

If there are additional queries (step 216), return to step 206 of searching the topic map meta-models. If there are no additional queries (step 216), the method ends.

FIG. 3 shows an example of a possible relationship between a topic map meta-model identifying assets 305, a topic map meta-model identifying events 306, a topic map meta-model that represents the semantic mapping of assets to events 307, and a topic map meta-model 308 with associations between the assets and events in the third topic map meta-model and direction of impact.

Figure 8:
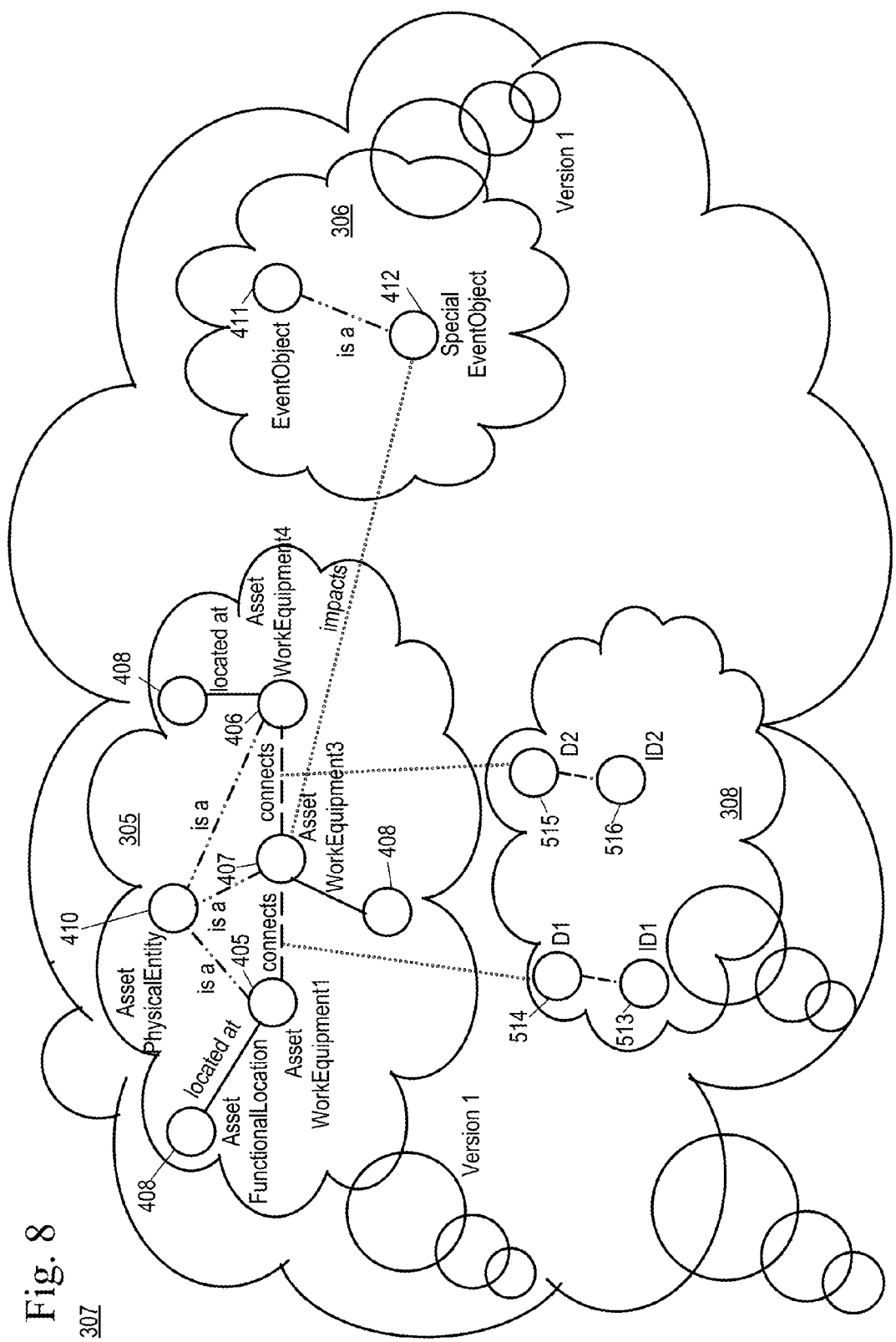
FIG. 8 shows an exemplary portion of a topic map representation of a meta-model identifying mapping of assets to events and an exemplary portion of a topic map representation of a meta-model identifying directionality of the mappings of at least some of the associations between assets and events.

Stored within the resource description framework (RDF) repository, for example repository 53, are RDF triples of the assigned topics, occurrences, and attributes of the topic map meta-model 308 that assigns directional impact to impact associations (shown in FIG. 8). The topics may provide the actual directionality of impact or a link to the actual directional impact.

Stored within a resource description framework (RDF) repository, for example repository 53, are RDF triples of the assigned topics, occurrences, and attributes of the topic map meta-model that identifies assets 305. An asset meta-model 303 in which a topic map meta-model that identifies assets 305 is based may be stored within repository 53 or in a separate repository 301.

From a uniform modeling language (UML) representation 403 (shown in FIG. 4) of meta-model 303 which identifies assets, the RDF triples in Table 2 below represent an association between an Asset_WorkEquipment being connected to the other pieces of Asset_WorkEquipment. The relationship between Asset_WorkEquipment and other pieces of Asset_WorkEquipment is the type "equipment_connects". For example, Asset_WorkEquipment3 407 is connected to Asset_WorkEquipment4 406 and Asset_WorkEquipment1 405 is connected to Asset_WorkEquipment3 407.

Note that for brevity in the following discussion, the following RDF namespace prefixes will be used, with (URLx) replacing an actual Uniform Resource Locator designation, or other designation of a location on a network:

TABLE 1

| Prefix | Prefix |
| --- | --- |
| rdf_syntax | http |
| Foo | (URL1) |
| Anne | (URL2) |

Therefore, for foo#asset_Workequipment_ Equipment-Connects_Asset_WorkEquipment, the following RDF triples would be present in the RDF repository for the association between WorkEquipment and Asset_WorkEquipment.

TABLE 2

| Subject | Predicate | Object |
| --- | --- | --- |
| foo#asset_workequipment_equipmentconnects_asset_workequipment | rdf_syntax#type | anne#association |
| foo#asset_workequipment_equipmentconnects_asset_workequipment | foo#type | foo#equipment_connects |
| foo#asset_workequipment_equipmentconnects_asset_workequipment | . . . | . . . |

Stored within the resource description framework (RDF) repository, for example repository 53, are RDF triples of the assigned topics, occurrences, and attributes of topic map meta-model 306 that identifies events. An event meta-model 304 in which a topic map meta-model that identifies events 306 is based may be stored within repository 53 or in a separate repository 302.

From a UML representation 404 (shown in FIG. 5) of a meta-model which identifies events 304, the RDF triples in Table 3 below represent an association between a Special EventObject being a type of EventObject. The relationship between Special EventObject and EventObject is the type "is_a". Therefore, for foo#special EventObject_is_a_Event Object, the following RDF triples would be present in the RDF repository for the association between Special Event Object and EventObject.

arrowed lines. Special EventObject 412 is a type of Event Object 411 as indicated by the solid line and open arrow.

Figure 6:
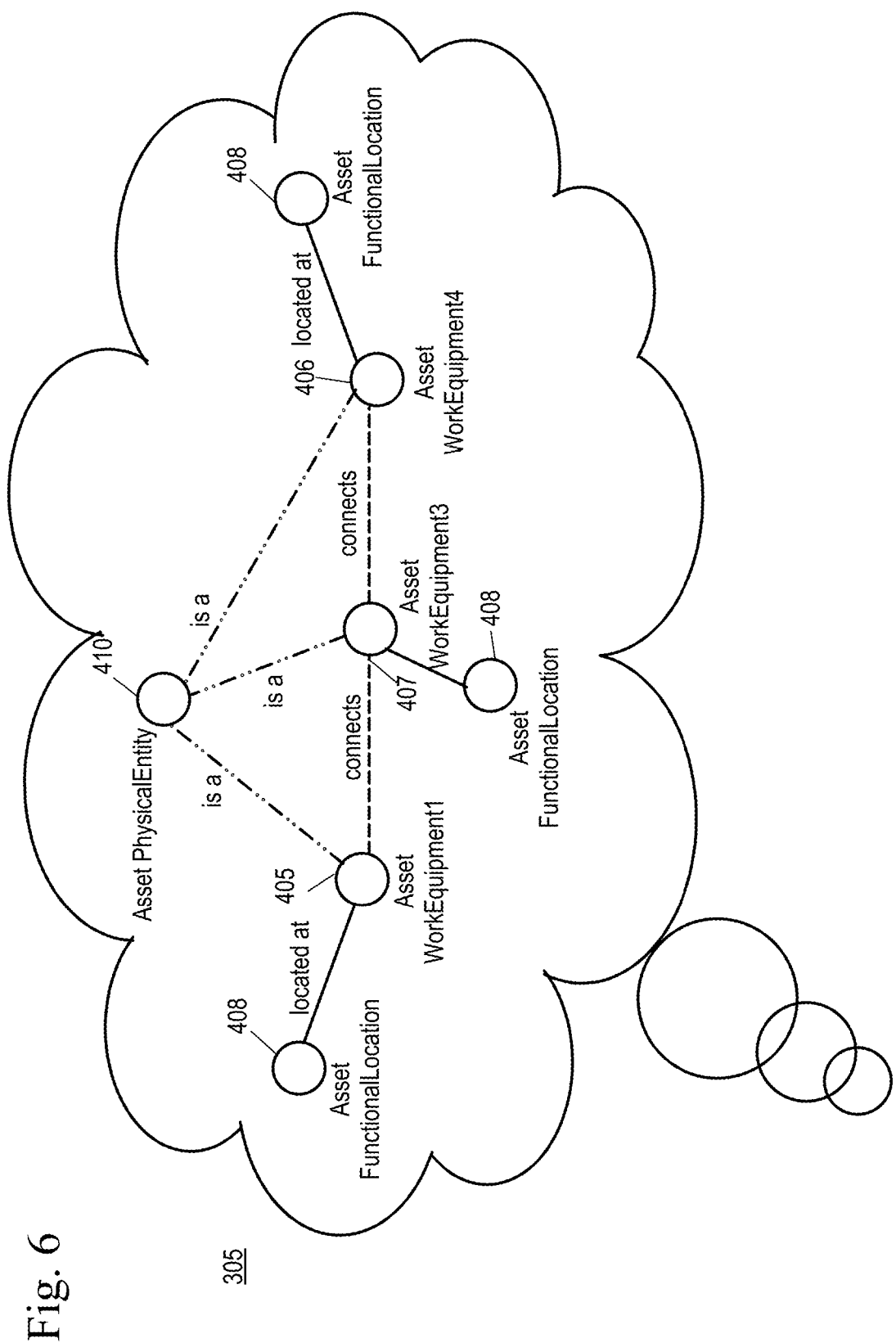
FIG. 6 shows an example of a portion of a topic map representation of a meta-model identifying assets.

FIG. 6 shows an example of a portion of a topic map representation 305 of meta-model 303. In FIG. 6, the portion of the topic map representation 305 of meta-model 303 shows only the relationship between associated Asset_WorkEquipment 405, 406, 407 of Asset_WorkEquipment 409 and Asset_FunctionalLocation 408, and between Asset_WorkEquipment 409 and Asset_PhysicalEntity 410.

In the portion of the topic map representation 305 shown in FIG. 6, the topic of Asset_WorkEquipment1 405, the topic of Asset_WorkEquipment3 407, and the Asset_WorkEquipment4 406 are located at or have occurrences at Asset_FunctionalLocation 408 (shown by a solid line). The topic of Asset_WorkEquipment1 405, the topic of Asset_WorkEquipment3 407, and the Asset_WorkEquipment4

TABLE 3

| Subject | Predicate | Object |
| --- | --- | --- |
| foo#specialEventObject_is_a_EventObject | Rdf-syntax#type | anne#association |
| foo#specialEventObject_is_a_EventObject | foo#type | foo#is_a |
| foo#specialEventObject_is_a_EventObject | . . . | . . . |

Figure 4:
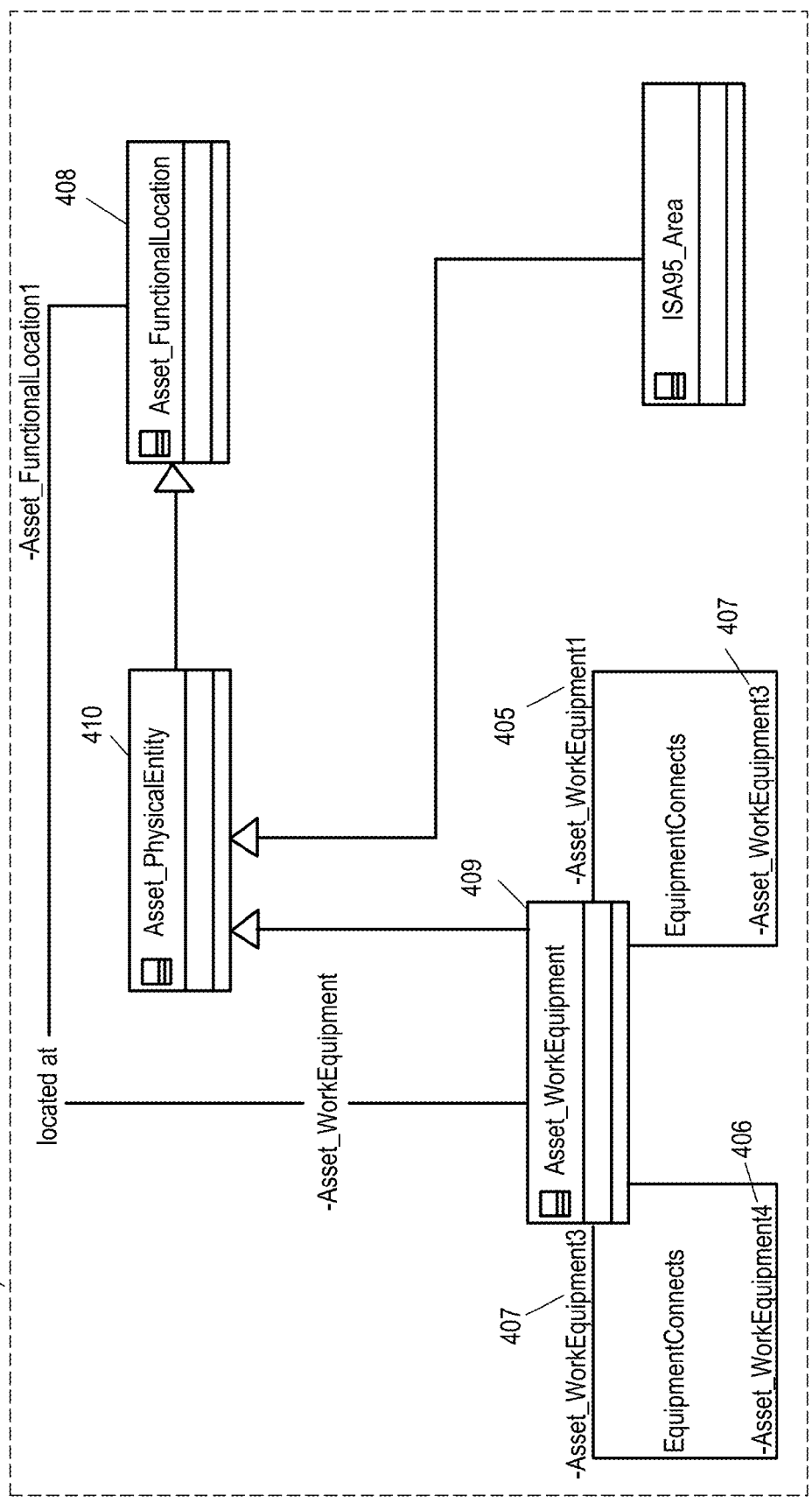
FIG. 4 shows an example of a UML representation of a meta-model identifying assets.

FIG. 4 shows an example of UML representation 403 of an asset meta-model 303 that identifies assets. Asset_WorkEquipment 409 is located at or has an occurrence at Asset_FunctionalLocation 408. Asset_WorkEquipment 409 has the attributes or plays the role of equipment and is an Asset_PhysicalEntity 410. The Asset_WorkEquipment 409 has Asset_WorkEquipment3 407, Asset_WorkEquipment4, 406, and Asset_WorkEquipment1 405. While not shown, the Asset_WorkEquipment 409 may also contain other Asset_WorkEquipment. Asset_WorkEquipment3 407 is connected to Asset_WorkEquipment4 406 and Asset_ WorkEquipment1 405 is connected to Asset_WorkEquipment3 407. ISA95_Area, which is shown in FIG. 4, is not shown in FIG. 8 in order to focus the relationships that will occur in the topic map meta-model that represents semantic mapping of assets to events.

Figure 5:
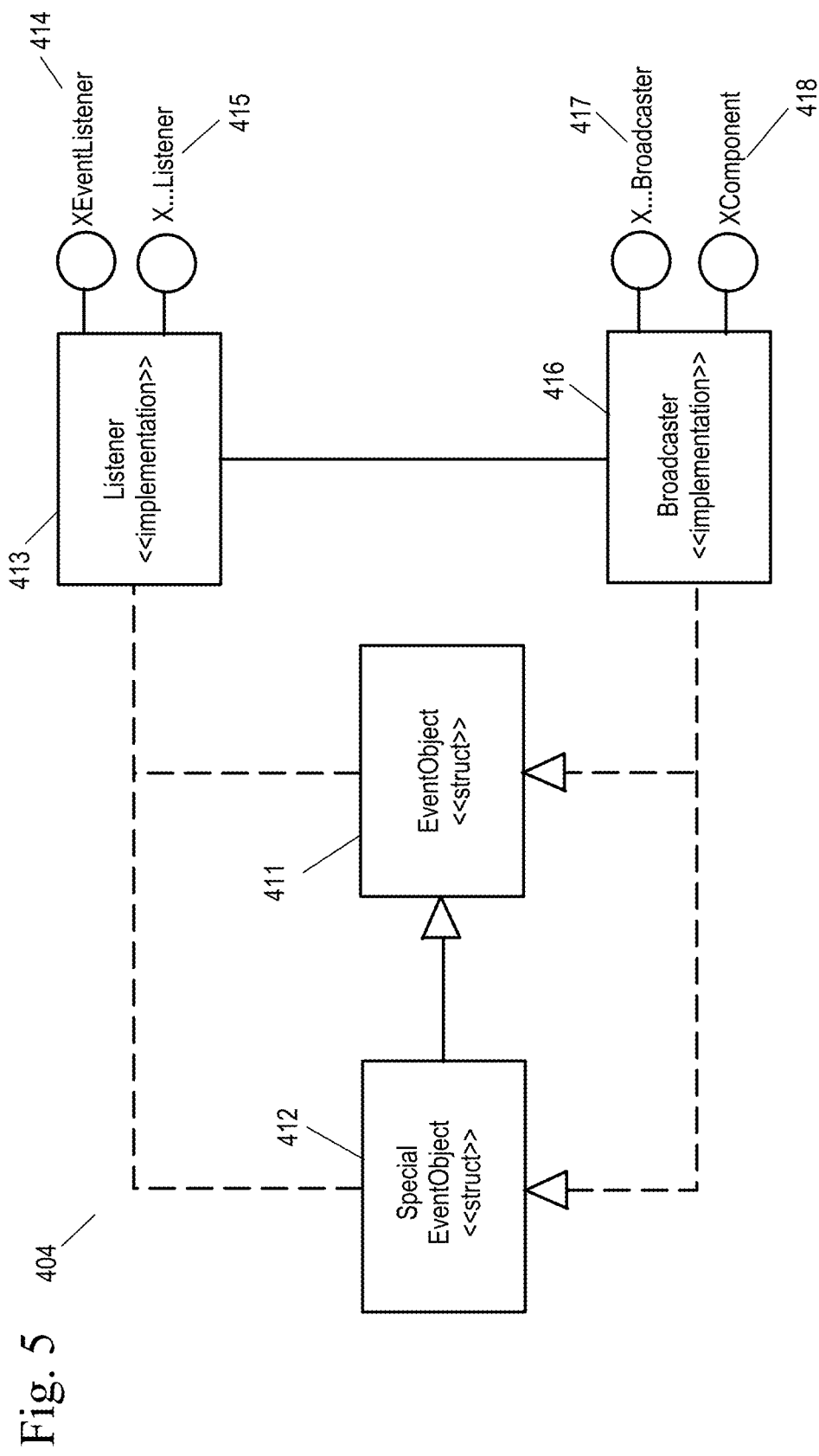
FIG. 5 shows an example of a UML representation of a meta-model identifying events.

FIG. 5 shows an example of a UML representation 404 of an event meta-model 304. A Broadcaster 416, which is an implementation of an event source and includes for example, X . . . Broadcaster 417 and XComponent, 418, broadcasts events based on an EventListenerList to a Listener 413 (as shown by a solid line). It should be noted that for this application, the term "event" is defined as any predetermined occurrence that the event source considered significant enough to tell other objects about.

Listener 413 has event listeners, for example XEventListener 414 and X . . . Listener 415, which each receive information regarding event objects. An event object, for example EventObject 411 or Special EventObject 412, is an object that describes the nature of an event and stores properties and information regarding the event.

Broadcaster 416 is associated with EventObject 411 and Special EventObject 412 as shown by the dashed open 406 have the attributes or play the role of equipment and are Asset_PhysicalEntity 410 (shown by a dash-dot-dot line). The topic Asset_FunctionalLocation 408 has the attributes or plays the role of location. The topic of Asset_WorkEquipment1 405 is connected (shown by the dashed line) to the topic of Asset_WorkEquipment3 407, and the topic of Asset_WorkEquipment3 407 is connected to the Asset_WorkEquipment4 406.

Figure 7:
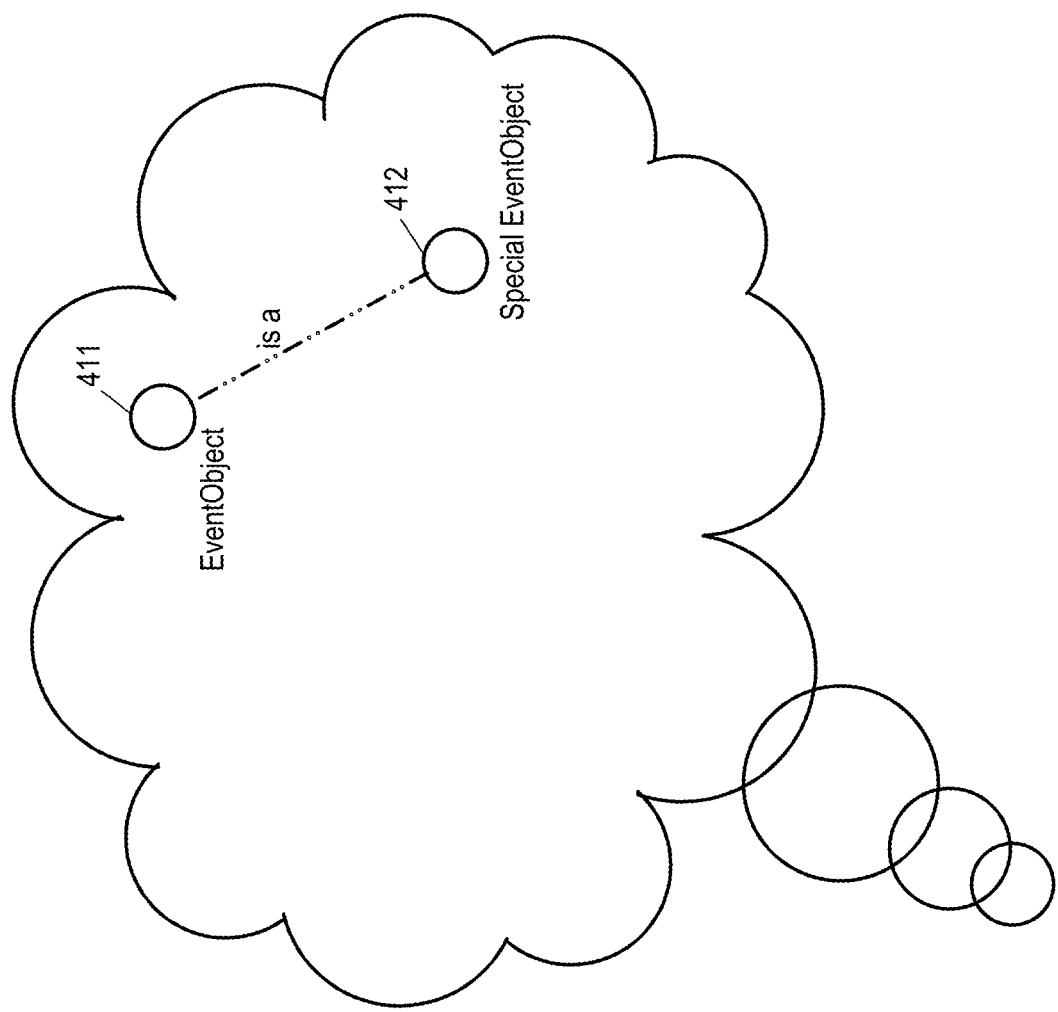
FIG. 7 shows an example of a portion of a topic map representation of a meta-model identifying events.

FIG. 7 shows an example of a portion of a topic map representation 306 of meta-model 304. In the portion of the topic map representation 306 shown in FIG. 7, the topic of Special EventObject 412 is an Event Object 411 (shown by the dash-dot-dot line). The topics of Listener and Broadcaster shown in FIG. 5 are not shown in FIG. 7 in order to focus the relationships that will occur in the topic map meta-model that represents the semantic mapping of assets to events 307.

FIG. 8 shows an exemplary portion of a topic map representation of the topic map meta-model that represents the semantic mapping of assets to events 307 and an exemplary portion of a topic map representation of the topic map meta-model in which directional impact is assigned to the impact associations.

The topic map meta-model that represents the semantic mapping of assets to events 307 includes a topic map representation of assets of the topic map meta-model identifying assets 305 and a topic map representation of events of the topic map meta-model identifying events 306. The dotted line shows which topics impact other topics. The dotted line is present between the asset topics and event topics.

As in FIGS. 6 and 7, the solid line indicates "located at", the dash-dot-dot line indicates "is a", and the dashed line indicates "connects". Therefore, Special EventObject 412, which "is an" EventObject 411, has an impact on Asset_WorkEquipment3 407, but does not affect Asset_FunctionalLocation 408 or the fact that Asset_WorkEquipment 409 is an Asset_PhysicalEntity 410.

Identification (ID1) 513 has a relationship (indicated by the dashed-dash-dot line) with direction (D1) 514, and the direction of impact (D1) 514 is between the Asset_WorkEquipment1 405 and the Asset_WorkEquipment3 407 due to the impact of the event and the Special EventObject 412 on Asset_WorkEquipment3 407. The direction of impact of the Special EventObject 412 on the Asset_WorkEquipment3 407 is equivalent to the direction (D1) 514 in a specific scope.

Identification (ID2) 515 has a relationship (indicated by the dashed-dash-dot line) with direction (D2) 516, and the direction of impact (D2) 516 is between the Asset_WorkEquipment3 407 and the Asset_WorkEquipment4 406 due to the impact of the event and the Special EventObject 412 on Asset_WorkEquipment3 407. The direction of impact of the Special EventObject 412 on the Asset_WorkEquipment3 407 is equivalent to the direction (D2) 516 in a specific scope.

The impact effect of an event will be communicated from the initial starting point (asset) through to connected assets. Those connected assets will not be affected to the same degree. The degree of effect will be based on the directional flow being transmitted along that connection between or through assets.

The identification is unique to the association between the assets as caused by the impact of the event. As discussed earlier, an identification (ID1, ID2) would include, an identifier corresponding to the association between assets and the asset impacted by the event to identify the direction of impact (D1, D2), an identifier of the topics of the association (T1, T2 . . . Tn), an identifier of the impact of one of the topics on another topic in the association or the roles the topics play in the association, for example impactee vs. impactor (R1, R2 . . . Rn), an identifier of the scope (S1, S2 . . . Sn), and the direction of the impact on the association (D1, D2 . . . Dn). The reference "n" being equivalent to any number greater than zero.

In terms of FIG. 8, identification ID1 would include an identifier number associated with the specific association between Asset_WorkEquipment1 405 and Asset_WorkEquipment3 407 which is impacted by the Special EventObject 412, for example 10100, which may be stored in a repository for lookup. The identification ID1 also includes identifiers of the topics of the association and could for example be represented as T1 and T2, which may be stored in a repository for lookup. In FIG. 8, T1 would be equivalent to Asset_WorkEquipment1 405 and T2 would be equivalent to Asset_WorkEquipment3 407. The topics T1 and T2 would also include information regarding the role in the association, for example topic T1 may be associated with the role R1 of impactor and topic T2 may be associated with the role R2, of the impactee in a specific scope S1. It should be noted that in certain scopes, the roles of the topics may not be the same. Furthermore, in certain scopes, the direction of impact may change between the topics in the impact associations.

Therefore, based on FIG. 8, ID1 would include the following or make reference to the following identifiers being stored in a repository, for example repository 302, 53:
ID=10100
T1=Asset_WorkEquipment1
T2=Asset_WorkEquipment3
R1=Special EventObject is the impactor
R2=Asset_WorkEquipment3 is the impactee
D1=direction of the association (The direction of impact of the Special EventObject is from Asset_WorkEquipment3 to Asset_WorkEquipment1.) Note that this is dependent on the upstream or downstream direction of flow through an asset within the infrastructure of the network.
S1=scope 1, representing the directionality FIG. 9 shows an exemplary portion of a topic map representation of a meta-model of a power distribution network identifying mapping of assets to events and an exemplary portion of a topic map representation of a meta-model identifying directionality of the mappings of at least some of the associations between assets and events.

Figure 9:
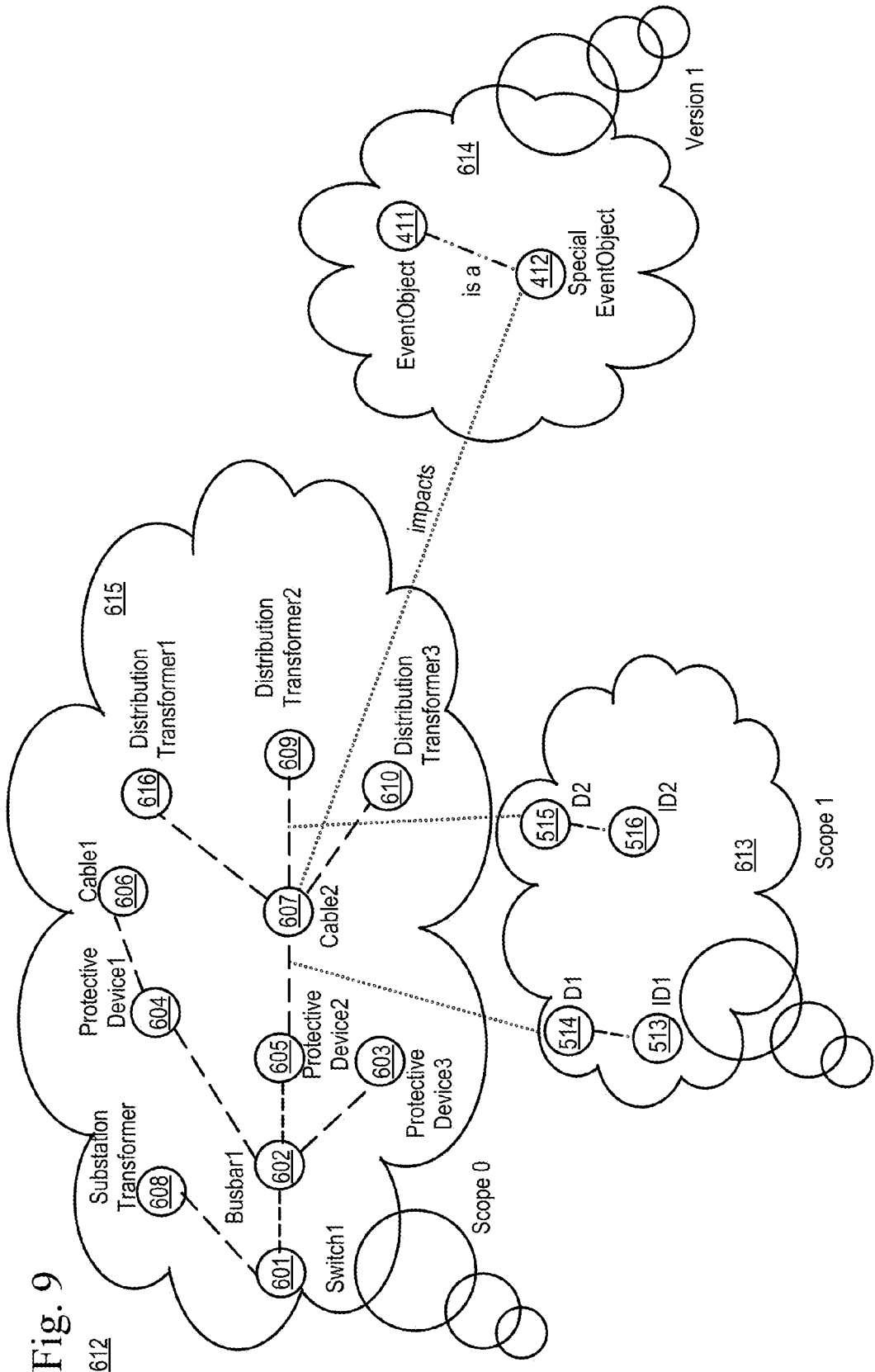
FIG. 9 shows an exemplary portion of a topic map representation of a meta-model of a power distribution network identifying mapping of assets to events and an exemplary portion of a topic map representation of a meta-model identifying directionality of the mappings of at least some of the associations between assets and events.

The topic map meta-model 613 of FIG. 9 that represents the semantic mapping of assets to events, similar to topic map meta-model 307, which includes a topic map representation of assets of the topic map meta-model identifying assets 615, similar to topic map meta-model 305 and a topic map representation of events of the topic map meta-model identifying events 614, similar to topic map meta-model 306. The dotted line shows which topics impact other topics. The dotted line is present between the asset topics and event topics.

The dashed line indicates "connects". Therefore, a Substation Transformer 608 is connected to a Switch1 601, which is connected to the a Busbar1 602. The Busbar1 602 is connected to Protective Device1 604, Protective Device2 605 and Protective Device3 603. Protective Device2 605 is connected to a Cable2 607, which connects to Distribution Transformer1 615, Distribution Transformer2 609 and Distribution Transformer3 610. Additionally, the Protective Device1 604 is connected to a Cable1 606. Scope 0 describes the static connectivity of the power distribution network.

Scope 1 represents the flow direction of the network and indicates how power flows from one role of the association to another role of the association due to the impact of the event and the Special EventObject 412. The Special EventObject 412 may be a failure of Cable2 607.

Identification (ID1) 513 has a relationship (indicated by the dashed-dash-dot line) with direction (D1) 514, and the direction of impact (D1) 514 is between the Protective Device2 605 and the Cable2 607 due to the impact of the event and the Special EventObject 412 on Cable2 607. The direction of impact of the Special EventObject 412 on the Cable2 607 is equivalent to the direction (D1) 514 in a specific scope, for example scope 1.

Identification (ID2) 516 has a relationship (indicated by the dashed-dash-dot line) with direction (D2) 515, and the direction of impact (D2) 515 is between the Cable2 607 and the Distribution Transformer2 609 due to the impact of the event and the Special EventObject 412 on Distribution Transformer2 609. The direction of impact of the Special EventObject 412 on the Distribution Transformer2 609 is equivalent to the direction (D2) 516 in a specific scope, for example scope 1.

The identification is unique to the association between the assets as caused by the impact of the event. As discussed earlier, an identification (ID1, ID2) would include, an identifier corresponding to the association between assets and the asset impacted by the event to identify the direction of impact (D1, D2), an identifier of the topics of the association (T1, T2 . . . Tn), an identifier of the impact of one of the topics on another topic in the association or the roles the topics play in the association, for example impactee vs. impactor (R1, R2 . . . Rn), an identifier of the scope (S1, S2 . . . Sn) which may include the direction of the impact on the association (D1, D2 ... Dn). The reference "n" being equivalent any number greater than zero. It should be noted that scope may include additional metadata regarding the associations such as versioning metadata, temporal metadata, and weights of impact metadata.

In terms of FIG. 9, identification ID1 would include an identifier number associated with the specific association between Protective Device2 605 and Cable2 607, which is impacted by the Special EventObject 412, for example 10101, which may be stored in a repository for lookup. The identification ID1 also includes identifiers of the topics of the association and could for example be represented as T1 and T2, which may be stored in a repository for lookup. In FIG. 9, T1 would be equivalent to Protective Device2 605 and T2 would be equivalent to Cable2 607. The topics T1 and T2 would also include information regarding the role in the association, for example topic T1 may be associated with the role R1 of impactor and topic T2 may be associated with the role R2, of the impactee in a specific scope S1. It should be noted that in certain scopes, the roles of the topics may not be the same. Furthermore, in certain scopes, the direction of impact may change between the topics in the impact associations. For example, in scope 0, where scope is the city grid, static connectivity is present, where in scope 1, power flow and directionality is present.

Therefore, based on FIG. 9, ID1 would include the following or make reference to the following identifiers being stored in a repository, for example repository 302, 53:
ID=10101
T1=Protective Device2
T2=Cable2
R1=protective device is a protector and is the impactor
R2=cable is being protected and is the impactee
D1=direction of the association (The direction of impact of the protective device2 on the cable2). Note that this is dependent on the upstream or downstream direction of flow through an asset within the infrastructure of the network.
S0=city, grid Alternatively, and based on FIG. 9, ID2 would include the following or make reference to the following identifiers being stored in a repository, for example repository 302, 53:
ID=10111
T1=Cable2
T2=Distribution Transformer2
R1=Special EventObject is the impactor
R2=Cable2 is the impactee
D1=direction of the association (The direction of impact of the Special EventObject is from Cable2 to the Distribution Transformer2). Note that this is dependent on the upstream or downstream direction of flow through an asset within the infrastructure of the network
S1=directionality impact FIG. 10 illustrates internal and external components of client computer 52 and server computer 54 in which illustrative embodiments may be implemented. In FIG. 10, client computer 52 and server computer 54 include respective sets of internal components 800*a*, 800*b*, and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, topic map generator program 67 and asset-and-event compare program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 10, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Topic map generator program 67 and asset-and-event compare program 66 can be stored on at least one of one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. Topic map generator program 67 and asset-and-event compare program 66 can be downloaded to client computer 52 and server computer 54 from an external computer via a network (for example, the Internet, a local area network or other, wide area network) and network adapter or interface 836. From the network adapter or interface 836, topic map generator program 67 and asset-and-event compare program 66 are loaded into hard drive 830. The network may comprise copper wires, optical fibers, wireless transmission, routers, firewalls, switches, gateway computers and/or edge servers.

Each of the sets of external components 900*a*, 900*b* includes a computer display monitor 920, a keyboard 930, and a computer mouse 934. Each of the sets of internal components 800*a*, 800*b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Topic map generator program 67 and asset-and-event compare program 66 can be written in various programming languages including low-level, high-level, object-oriented or non object-oriented languages. Alternatively, the functions of topic map generator program 67 and asset-and-event compare program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of assigning a direction of impact to an association between assets based on an impact of an event mapped to at least one of the assets, the method comprising the steps of:

a computer creating a first topic map meta-model that identifies assets and events in a topic map based index with instance ontology based on a topic map meta model that identifies assets and a topic map meta-model that identifies events, mapping assets to events through at least one association between at least one asset of the topic map meta-model that identifies assets and at least one event of the topic map meta-model that identifies events;

the computer assigning an identification in the first topic map meta-model to the at least one association between at least one asset of the topic map meta-model that identifies assets and at least one event of the topic map meta-model that identifies events;

the computer creating a second topic map meta-model that identifies at least one association between at least one asset and at least one event in a topic map based index and instance ontology with the direction of impact of the event on an association in various scopes between assets, based on an impact of the event on at least one of the assets of the association;

in response to a new event being added to the topic map meta-model identifying events, the computer re-creating the first topic map meta-model for the new event and the second topic map meta-model, adjusting the direction of impact associated with the association in the first topic map meta-model, the re-created first map meta-model including a topic map based index and instance ontology for the new event and the adjusted direction of impact; and the computer storing the re-created first topic map meta-model and the re-created second topic map meta-model into a repository.

2. The method of claim 1, further comprising the step of the computer searching the first topic map meta-model and the second topic map meta-model stored in a repository, comprising the steps of:

the computer receiving a query input from a user;

the computer obtaining, from the query input, at least an identification of an association between at least one asset and at least one event in the first topic map meta-model;

the computer searching the second topic map meta-model for the identification; and the computer displaying direction of impact assigned to the association in at least one scope to the user.

3. The method of claim 1, wherein the step of the computer assigning an identification comprises the steps of:

assigning an identifier in the first topic map meta-model to each of the associations between at least one asset and at least one event;

identifying and assigning in the first topic map meta-model an identifier to the topics of the association and the roles of the topics in the association; and identifying and assigning in the first topic map meta-model an identifier to a scope of the association between at least one asset and at least one event of the event topic map meta-model.

4. The method of claim 1, wherein the direction of impact is stored in a data structure.

5. The method of claim 4, wherein the data structure is stored within the second topic map meta-model.

6. A computer program product for assigning a direction of impact to an association between assets based on an impact of an event mapped to at least one of the assets, comprising a computer comprising at least one processor, one or more memories, one or more computer readable storage media, the computer program product comprising a computer readable storage medium having program instructions embodied therewith, the program instructions executable by the computer to perform a method comprising:

creating, by the computer, a first topic map meta-model that identifies assets and events in a topic map based index with instance ontology based on a topic map meta model that identifies assets and a topic map meta-model that identifies events, mapping assets to events through at least one association between at least one asset of the topic map meta-model that identifies assets and at least one event of the topic map meta-model that identifies events;

assigning, by the computer, an identification in the first topic map meta-model to at least one association between at least one asset of the topic map meta-model that identifies assets and at least one event of the topic map meta-model that identifies events;

creating, by the computer, a second topic map meta-model that identifies at least one association between at least one asset and at least one event in a topic map based index and instance ontology with the direction of impact of the event on an association in various scopes between assets based on an impact of the event on at least one of the assets of the association;

in response to a new event being added to the topic map meta-model identifying events, the computer re-creating the first topic map meta-model for the new event and the second topic map meta-model, adjusting the direction of impact associated with the association in the first topic map meta-model, the re-created first map meta-model including a topic map based index and instance ontology for the new event and the adjusted direction if impact; and storing, by the computer, the re-created first topic map meta-model and the re-created second topic map meta-model into a repository.

7. The computer program product of claim 6, further comprising the program instructions to search, by the computer the first topic map meta-model and the second topic map meta-model stored in a repository, comprising:

receiving, by the computer a query input from a user;

obtaining from the query input, by the computer, at least an identification of an association between at least one asset and at least one event of in the first topic map meta-model;

searching, by the computer, the second topic map meta-model for the identification; and displaying, by the computer, direction of impact assigned to the association in at least one scope to the user.

8. The computer program product of claim 6, wherein the program instructions of assigning identification by the computer comprises the steps of:

assigning, by the computer, an identifier in the first topic map meta-model to each of the associations between at least one asset and at least one event;

identifying and assigning, by the computer, in the first topic map meta-model an identifier to the topics of the association and the roles of the topics in the association; and identifying and assigning, by the computer, in the first topic map meta-model an identifier to a scope of to the association between at least one asset and at least one event of the event topic map meta-model.

9. The computer program product of claim 6, wherein the direction of impact is stored in a data structure.

10. The computer program product of claim 9, wherein the data structure is stored within the second topic map meta-model.

11. A computer system for assigning a direction of impact to an association between assets based on an impact of an event mapped to at least one of the assets comprising a computer comprising at least one processor, one or more memories, one or more computer readable storage media having program instructions executable by the computer to perform the program instructions comprising:

creating, by the computer, a first topic map meta-model that identifies assets and events in a topic map based index with instance ontology based on a topic map meta model that identifies assets and a topic map meta-model that identifies events, mapping assets to events through at least one association between at least one asset of the topic map meta-model that identifies assets and at least one event of the topic map meta-model that identifies events;

assigning, by the computer, an identification in the first topic map meta-model to at least one association between at least one asset of the topic map meta-model that identifies assets and at least one event of the topic map meta-model that identifies events;

creating, by the computer, a second topic map meta-model that identifies at least one association between at least one asset and at least one event in a topic map based index and instance ontology with the direction of impact of the event on an association in various scopes between assets based on an impact of the event on at least one of the assets of the association;

in response to a new event being added to the topic map meta-model identifying events, the computer re-creating the first topic map meta-model for the new event and the second topic map meta-model, adjusting the direction of impact associated with the association in the first topic map meta-model, the re-created first map meta-model including a topic map based index and instance ontology for the new event and the adjusted direction if impact; and storing, by the computer, the re-created first topic map meta-model and the re-created second topic map meta-model into a repository.

12. The computer system of claim 11, further comprising further comprising the program instructions to search, by the computer the first topic map meta-model and the second topic map meta-model stored in a repository, comprising:

receiving, by the computer a query input from a user;

obtaining from the query input, by the computer, at least an identification of an association between at least one asset and at least one event of in the first topic map meta-model;

searching, by the computer, the second topic map meta-model for the identification; and displaying, by the computer, direction of impact assigned to the association in at least one scope to the user.

13. The computer system of claim 11, wherein the program instructions of assigning identification by the computer comprises the steps of:

assigning, by the computer, an identifier in the first topic map meta-model to each of the associations between at least one asset and at least one event;

identifying and assigning, by the computer, in the first topic map meta-model an identifier to the topics of the association and the roles of the topics in the association; and identifying and assigning, by the computer, in the first topic map meta-model an identifier to a scope of to the association between at least one asset and at least one event of the event topic map meta-model.

14. The computer system of claim 11, wherein the direction of impact is stored in a data structure.

15. The computer system of claim 14, wherein the data structure is stored within the second topic map meta-model.

* * * * *